United States Patent

Nagano et al.

Patent Number: 5,214,466
Date of Patent: May 25, 1993

[54] CAMERA HAVING VISUAL AXIS DETECTING APPARATUS

[75] Inventors: Akihiko Nagano, Kawasaki; Kazuki Konishi, Hino; Akira Yamada; Yasuo Suda, both of Yokohama, all of Japan

[73] Assignee: Canon Kabushiki Kaisha, Tokyo, Japan

[21] Appl. No.: 683,785

[22] Filed: Apr. 11, 1991

[30] Foreign Application Priority Data

Apr. 11, 1990 [JP] Japan .................................. 2-95599
Feb. 22, 1991 [JP] Japan .................................. 3-28633
Mar. 13, 1991 [JP] Japan .................................. 3-48088

[51] Int. Cl.⁵ .............................................. G03B 13/36
[52] U.S. Cl. .................................... 354/402; 354/62; 354/219; 354/410
[58] Field of Search ............... 354/400, 402, 403, 62, 354/219, 410

[56] References Cited

U.S. PATENT DOCUMENTS

| 4,574,314 | 3/1986 | Weinblatt | 354/400 |
| 4,828,381 | 5/1989 | Shindo | 354/62 |
| 4,974,010 | 11/1990 | Cleveland et al. | 354/403 |
| 5,036,347 | 7/1991 | Tsunekawa et al. | 354/400 |
| 5,155,516 | 10/1992 | Shindo | 354/219 |

Primary Examiner—Russell E. Adams
Attorney, Agent, or Firm—Robin, Blecker, Daley & Driscoll

[57] ABSTRACT

A camera having a line of sight detecting apparatus to detect a line of sight of an eyeball of an observer comprises: a lens device having a movable lens; a detector to detect a moving state of the movable lens in the lens device; and a controller for making the line of sight detecting operation by the visual axis detecting apparatus different from that in the case where the movable lens is not moved when it is detected by the detector that the movable lens has been moved. When a focusing lens as a movable lens is being driven, the controller stops the line of sight detecting operation by the visual axis detecting apparatus or doesn't use the line of sight detection information for the camera control.

50 Claims, 13 Drawing Sheets

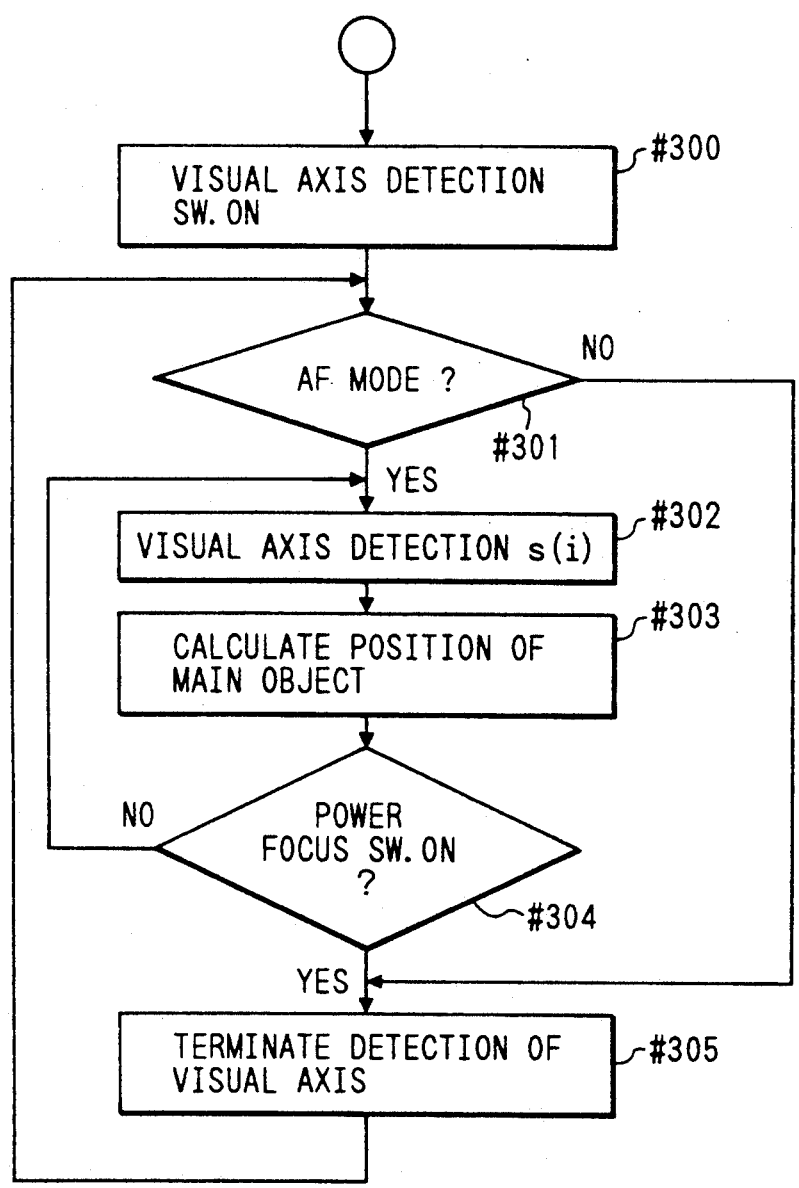

CAMERA HAVING VISUAL AXIS DETECTING APPARATUS

BACKGROUND OF THE INVENTION

1. Field of the Invention

The present invention relates to a camera having a line of sight detecting apparatus for detecting a line of sight of an observer.

2. Related Background Art

Hitherto, the assignee of the present invention has proposed various apparatuses for detecting which position on an observing surface an observer or a photographer is observing, namely, for detecting what is called a line of sight (U.S. patent Ser. Nos. 327784, 475756, 584896, and 406588).

Parallel light fluxes from a light source are projected to a front eye part of the eyeball of the observer and the visual axis is obtained by using a Purkinje image by the reflected light from the cornea and an image forming position of the pupil.

FIGS. 5A and 5B are diagrams for explaining the principle of a line of sight detecting method. FIG. 5A is a schematic diagram of a line of sight detection optical system and FIG. 5B is a diagram showing an output intensity of a photoelectric conversion element array 6.

In the diagrams, reference numeral 5 denotes a light source such as a light emitting diode or the like for emitting an infrared light which is not sensed by an observer. The light source 5 is arranged on a focal point surface of a light projection lens 3.

The infrared light emitted from the light source 5 is converted into the parallel light by the light projection lens 3 and is reflected by a half mirror 2 and irradiates a cornea 21 of the eyeball. At this time, a Purkinje image d (virtual image) by a part of the infrared light reflected by the surface of the cornea 21 passes through the half mirror 2 and is converged by a light, reception lens 4 and is projected to a position $Z_d'$ on the photoelectric conversion element array 6.

The light fluxes from edge portions a and b of an iris 23 are transmitted through the light reception lens 4 and images of the edge, portions a and b are formed at positions $Z_a'$ and $Z_b'$ on the photoelectric conversion element array 6. In the case where a rotational angle $\theta$ of an optical axis K of the eyeball for an optical axis J of the light reception lens 4 is small, coordinates $Z_c$ of a center position c of a pupil 24 are expressed by $$Z_c \approx (Z_a + Z_b)/2$$

by assuming that Z coordinates of the edge portions a and b of the iris 23 are set to $Z_a$ and $Z_b$.

On the other hand, since the Z coordinates of the Purkinje image d coincide with the Z coordinates of a center O of the radius of curvature of the cornea 21, the rotational angle $\theta$ of the eyeball optical axis K in which the Z coordinates of the generating position d of the cornea reflection image are set to $Z_d$ and a distance between the center O of the radius of curvature of the cornea 21 and the center C of the pupil 24 is set to $\overline{OC}$ almost satisfies the following relational equation.

$$\overline{OC} \cdot \sin\theta \approx Z_c - Z_b \quad (1)$$

Therefore, in a central processing unit (CPU) 9, by detecting the positions of the singular points Purkinje image d and edge portions a and b of the iris) projected onto the photoelectric conversion element array 6 as shown in FIG. 5B, the rotational angle $\theta$ of the eyeball optical axis K can be obtained. At this time, the equation (1) is rewritten an follows.

$$\beta \cdot \overline{OC} \cdot \sin\theta \approx (Z_a' + Z_b')/2 - Z_d' \quad (2)$$

where, $\beta$ is a magnification which is determined by the position of the eyeball relative to the light reception lens 4.

Further, when the rotational angle $\theta$ of the eyeball optical axis of the observer is calculated, by correcting the optical axis pf the eyeball and the line of sight, the line of sight of the observer can be obtained.

On the other hand, although the diagrams show an example in the case where the eyeball of the observer rotates in the Z-X plane (for instance, horizontal plane), the line of sight can be also similarly detected in the case where the eyeball of the observer rotates in the X-Y plane (e.g., vertical plane).

FIG. 6 is a schematic diagram showing a main section in the case where the line of sight detecting apparatus is arranged in a single-lens reflex camera. An object light which has been transmitted through a photographing lens 101 is reflected by a lift-up mirror 102 and forms an image at a position near a focal point surface of a focusing plate 104. The object lights diffused by the focusing plate 104 are, further led to an eye point X of a photographer through a condenser lens 105, a pentagonal lens 106, and an ocular lens 1.

A line of sight detection optical system is constructed by: an illumination optical system comprising the light source 5 such as an infrared light emitting diode or the like which is not sensed for a photographer (observer) and the light projection lens 3; and a light reception optical system comprising the photoelectric conversion element array 6 and the light reception lens 4. The line of sight detection optical system is arranged above the ocular lens 1 also serving as a dichroic mirror. An infrared light emitted from the infrared light emitting diode 5 is reflected by a dichroic mirror surface 1a and illuminates the eyeball of the photographer. Further, a part of the infrared light reflected by the eyeball is again reflected by the dichroic mirror surface 1a and is converged onto the photoelectric conversion element array 6 through the light reception lens 4. The direction of the line of sight the photographer is calculated by the CPU 9 on the basis of the image information (FIG. 5B) of the eyeball derived on the photoelectric conversion element array 6.

In the single-lens reflex camera, if it is known which point on the focal surface the photographer is observing as mentioned above, for instance, in the case of a camera having a focal point detecting apparatus which can detect a plurality of focal points in the finder screen, when the photographer intends to execute an automatic focal point detection by selecting one point which coincides with a main object, that is, an object to be photographed by the photographer, the operation to select and input such a single point is omitted and such a point is regarded as a point which the photographer is observing and such a point is automatically selected. The above method is effective to execute the automatic focal point detection.

However, in the recent single-lens reflex camera, generally, a zoom lens is attached and used. When the photographer executes a zooming, the position of the object in the finder screen is also moved during the zooming operation. In many cases, the position during the zooming doesn't coincide with the position of the object after completion of the zooming. Therefore, the motion of the line of sight during the zooming doesn't reflect the position of the line of sight after the zooming. There is a drawback such that if the camera is controlled by using the line of sight data obtained during the zooming, for instance, if a focal detection point is selected, an erroneous point is selected.

Further, to select a plurality of focal detection points or determine an exposure value from photometric values of a plurality of areas, it is necessary to detect one or more positions of the main object which the photographer wants to photograph. To accurately detect the positions of the main object which the photographer desires to photograph from the motion of the line of sight, such a position must be statistically detected from a plurality of line of sight information. Therefore, not only the line of sight is detected but also the visual axis information must be stored. If the zooming operation is performed during the accumulation of such information, the position of the main object is detected in a state in which the line of sight information for the position of the main object before the zooming which is different from the position of the main object after the zooming operation has also been accumulated, so that there is a drawback such that the position of the main object is erroneously detected.

In addition, in the case where the photographer who has been executing the photographing in an automatic focusing (AF) mode using the line of sight information tries to execute a focusing operation by changing the operating mode from the AF mode to the photographing operation in a manual focusing mode or a power focusing mode during the photographing operation, the line of sight information is unnecessary in both of the above focusing modes, so that the photographer needs to further execute an operation to stop the line of sight detection and there is a drawback such that the operation of the camera becomes complicated.

On the other hand, when a focal point of the point corresponding to the position of the main object (main line of sight) obtained from the visual axis information is detected and a focal point adjustment of the focusing lens is performed from a defocusing amount at such a point, the information is unnecessary during the driving of the lens to adjust the focal point of the focusing lens. In addition, even if the line of sight information obtained during the driving of the focusing lens is not used as position information upon execution of the focal point detection, there is a drawback such that the execution of the line of sight detection causes energy to be consumed in vain.

During the driving of the focusing lens, a display state in the finder is changing (that is, the focal point is changing). As a line of sight in such a state, in many cases, an object other than the main object is seen, so that there is a possibility such that erroneous information is obtained.

SUMMARY OF THE INVENTION

It is an object of the invention to provide a camera in which in the case where a zoom lens is executing a zooming operation, a line of sight detection is stopped or visual axis detection information is not used, thereby enabling a control, to be executed on the basis of correct line of sight information.

Another object of the invention is to provide a camera in which in a manual focusing mode, the line of sight detection is stopped or the visual axis detection information is not used, thereby faciliting photography.

Still another object of the invention is that in the case where a focusing lens is operating, the line of sight detection is stopped or the line of sight detection information is not used, thereby prohibiting the generation of erroneous line of sight information.

BRIEF DESCRIPTION OF THE DRAWINGS

FIG. 1 is a diagram showing the first embodiment applied to a single-lens reflex camera according to the invention;

FIG. 5 and 6 are diagrams showing a conventional example;

FIG. 6 is a schematic diagram of a main section of a single-lens reflex camera;

FIG. 12 is a flowchart of the fourth embodiment;

DETAILED DESCRIPTION OF THE PREFERRED EMBODIMENTS

Figure 1A:
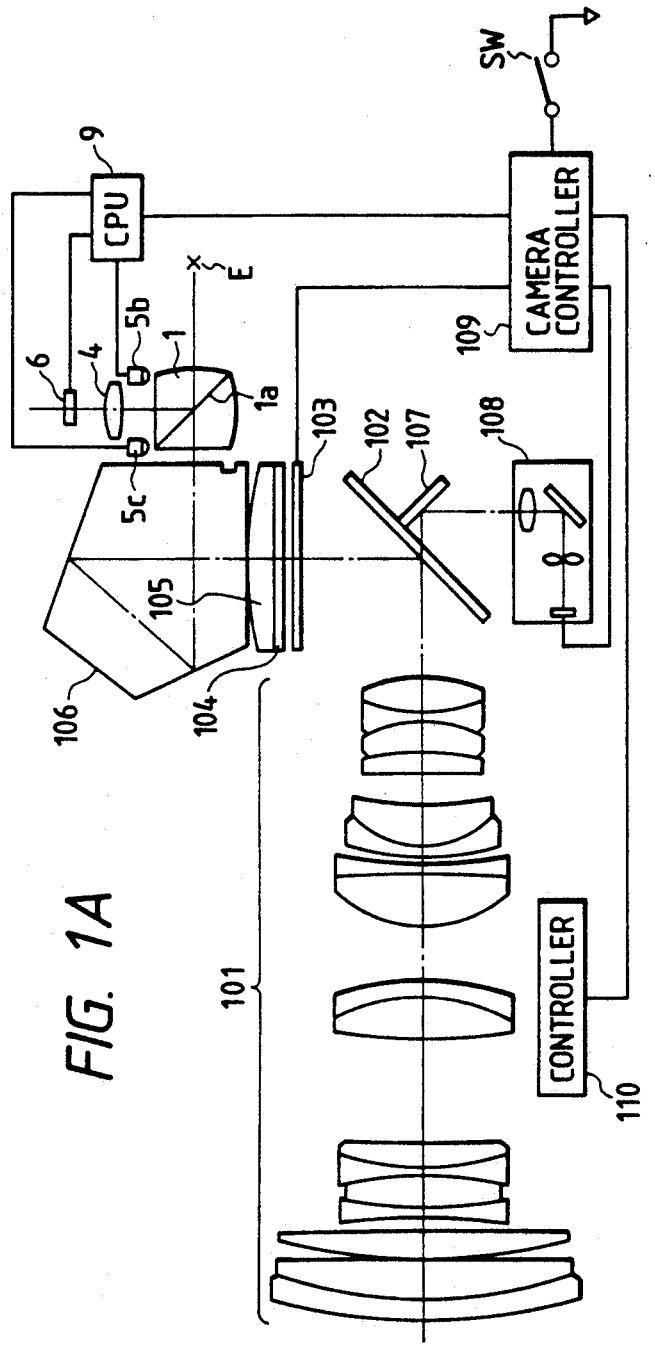
FIG. 1A is a schematic diagram showing the whole camera.
Figure 1B:
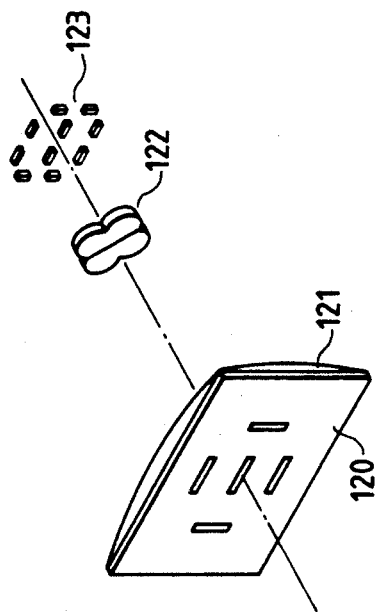
FIG. 1B is an exploded perspective view of a focal point detecting apparatus.
Figure 2:
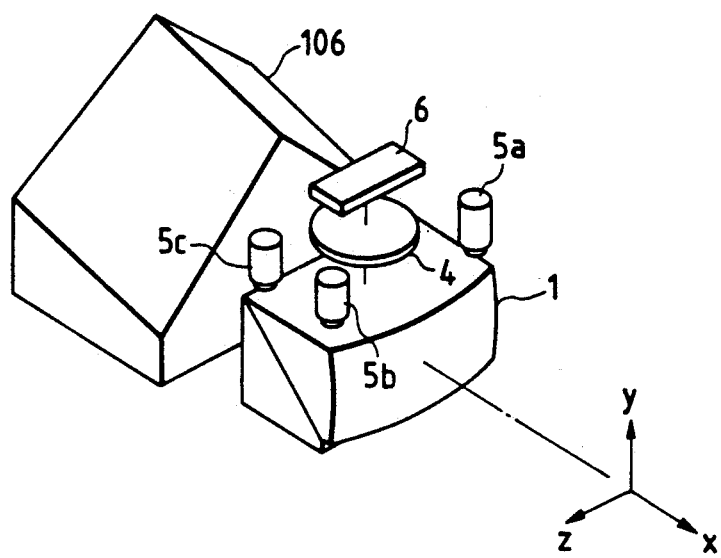
FIG. 2 is a perspective view of a main section showing an example of a line of sight detecting apparatus.

FIGS. 1 to 4 are diagrams showing the first embodiment of the invention. FIG. 1A is a schematic diagram of a single-lens reflex camera. FIG. 1B is a perspective view of a main section of a focal point detecting apparatus. FIG. 2 is a perspective view of a main section of a line of sight detecting apparatus. In the diagrams, reference numeral 1 denotes the ocular lens. The dichroic mirror 1a which transmits a visible light and reflects the infrared light is obliquely attached to the ocular lens 1, so that the ocular lens 1 also serves as a light dividing device. Reference numeral 4 denotes the light reception lens; 5a, 5b and 5c denote infrared light emitting diodes as illuminating light sources; and 6 the image sensor which is constructed by two-dimensionally arranging arrays of photoelectric conversion elements. The image sensor 6 is arranged so as to be conjugate with a portion near the pupil of the eye locating at a predetermined position with respect to the light reception lens 4 and the ocular lens 1. Reference numeral 9 denotes the central processing unit (CPU). In FIG. 2, the infrared light emitting diodes 5a, 5b, and 5c for illumination are used in a manner such that two diodes are used as a set in order to detect a distance between the camera and the eyeball of the observer. A proper set of the infrared light emitting diodes (5a and 5b: lateral position, or 5b and 5c: vertical position) is selected in accordance with the position of the camera. Although detecting means for detecting the position of the camera is not shown in the diagrams, position detecting means using a mercury switch or the like can be effectively used.

Further, reference numeral 101 denotes the photographing lens (including a zoom lens); 102 the lift-up mirror; 103 a display device; 104 the focusing plate; 105 the condenser lens; 106 the pentagonal prism; 107 a sub mirror; 108 a multi point focus detecting apparatus; 109 a camera controller; and 110 a controller having a function as a zoom encoder to detect a zooming operation, a function to control the driving of the lens, and a memory function. SW indicates a line of sight detection switch.

Since explanation of the multi point focus detecting apparatus 108 is not particularly necessary to understand the embodiment, it is schematically described here. As shown in FIGS. 1A and 1B, the apparatus 108 is arranged near a presumed image forming surface of the photographing lens 101. A visual field mask 120 having a plurality of slits each for deciding a focal point detection area and a lens member 121 which functions as a field lens for an image in each slit are closely arranged. Further, a set of image re-forming lenses 122 and a set of photoelectric conversion element arrays 123 as many as the number of slits are sequentially arranged. The slits, field lenses, set of image re-forming lenses, and set of photoelectric conversion element arrays comprise a well-known focus detection system. In FIG. 1B, the mirrors shown in the multi point focus detecting apparatus 108 of FIG. 1A are omitted. A part of the object light which has passed through the photographing lens 101 is reflected by the lift-up mirror 102 and forms an image at a position near the focusing plate 104. The object light transmitted through the diffusing surface of the focusing plate 104 is led to an eye point E through the condenser lens 105, pentagonal prism 106, and ocular lens 1. The photographer executes a framing operation while observing the object image projected onto the focusing, plate 104. At this time, the line of sight of the photographer moves around an object to be photographed as a center. The display device 103 is, for instance, a guest-host type liquid crystal device of the double-layer type using no polarizing plate and displays a focus detection area in the finder visual field.

A part of the object light which has been transmitted through the photographing lens 101 passes through the lift-up mirror 102 and is reflected by the sub mirror 107 and is led to the multi point focus detecting apparatus 108 arranged in the bottom portion of the camera main body. The detecting apparatus 108 detects a focus adjusting state of the area corresponding to the focus detection area signal on the basis of the focus detection area signal generated from the camera controller 109.

The visual field detecting apparatus according to the embodiment comprises: a line of sight detection optical system constructed by the component elements 1 and 4 to 6; and the CPU 9 to calculate the line of sight of the photographer. The infrared lights emitted from the diodes 5a and 5b enter the ocular lens 1 and are partially reflected by the dichroic mirror 1a and illuminate the eyeball of the observer (not shown) locating near the eye point E. The infrared lights reflected by the eyeball are reflected by the dichroic mirror 1a and are converged by the light reception lens 4 and form images onto the image sensor 6.

Figure 3A:
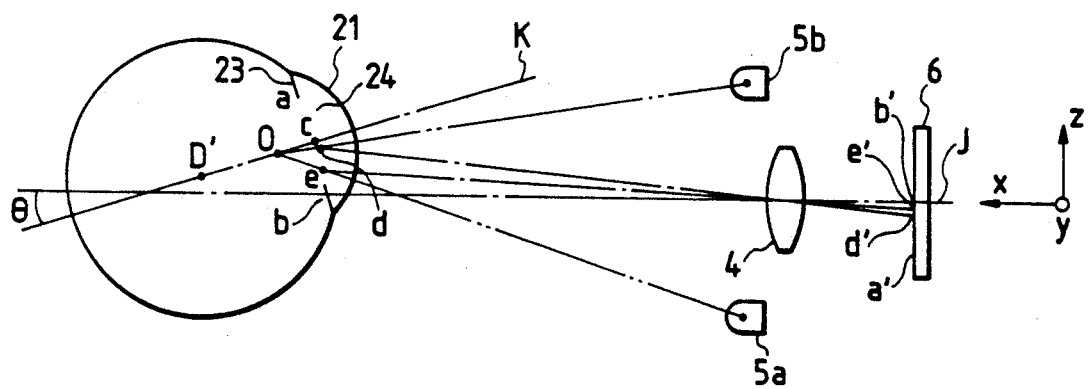
FIG. 3A is a schematic diagram showing the principle of the line of sight detecting apparatus.
Figure 3B:
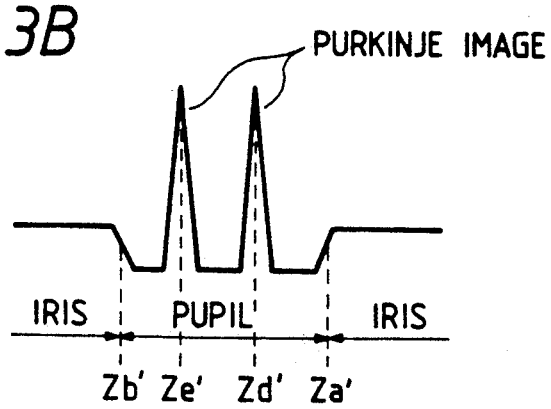
FIG. 3B is a diagram showing an output intensity on an image sensor.

FIG. 3 is a diagram for explaining the principle of the line of sight detecting method. FIG. 3A is a schematic diagram of the line of sight detection optical system. FIG. 3B is an output intensity diagram of the image sensor 6. In the diagrams, reference numerals 5a and 5b denote the light sources such as light emitting diodes or the like to emit infrared lights which are not sensed for the observer. The light sources are arranged in the Z direction almost symmetrically with respect to the optical axis J and divergence-illuminate the eyeball of the observer.

The infrared light emitted from the light source 5b irradiates the cornea 21 of the eyeball. At this time, the Purkinje image d formed by a part of the infrared light which had been reflected by the surface of the cornea 21 is converged by the light reception lens 4 and again forms an image at the position d' on the image sensor 6.

In a manner similar to the above, the infrared light emitted from the light source 5a illuminates the cornea 21 of the eyeball. At this time, a Purkinje image e formed by a part of the infrared light which had been reflected by the surface of the cornea 21 is converged by the light reception lens 4 and again forms an image at a position e' on the image sensor 6.

The light fluxes from the edge portions a and b of the iris 23 pass through the light reception lens 4 and form images of the edge portions a and b at the positions a' and b' on the image sensor 6. When the rotational angle $\theta$ of the optical axis K of the eyeball to the optical axis (J) of the light reception lens 4 is small, the coordinates $Z_c$ of the center position c of the pupil 24 are obtained by $$Z_c \simeq (Z_a + Z_b)/2$$

assuming that Z coordinates of the edge portions a and b of the iris 23 are set to $Z_a$ and $Z_b$.

On the other hand, since the Z coordinates of the intermediate point of the Purkinje images d and e coincide with the Z coordinates $Z_o$ of the center o of the radius of curvature of the cornea 21, the rotational angle $\theta$ of the optical axis K of the eyeball almost satisfies the following relational equation $$OC^* \sin\theta \simeq Z_c - (Z_d + Z_e)/2 \qquad (3)$$

where, $Z_d$, $Z_e$: Z coordinates of the generating positions d and e of the Purkinje images OC: distance from the center O of the radius of curvature of the cornea 21 to the center C of the pupil 24

Therefore, in the CPU 9, by detecting the positions of the singular points (Purkinje images d and e and edge portions a and b of the iris) projected to parts on the image sensor 6 as shown in FIG. 3B, the rotational angle $\theta$ of the eyeball optical axis K can be obtained. At this time, the equation (3) can be rewritten as follows.

$$\beta^* OC^* \sin\theta = (Z_a' + Z_b')/2 - (Z_d' + Z_e')/2 \qquad (4)$$

β denotes the magnification which is determined by the position of the eyeball for the light reception lens and is substantially a function of an interval $Z_d' - Z_e'$ between the cornea reflection images.

When the rotational angle 8 of the eyeball of the observer is calculated, the line of sight of the observer is obtained by correcting the optical axis of the eyeball and the line of sight. The arithmetic operation to obtain the line of sight of the observer as mentioned above is executed by a software of a microcomputer of the CPU 9 on the basis of the equation (4).

Figure 4:
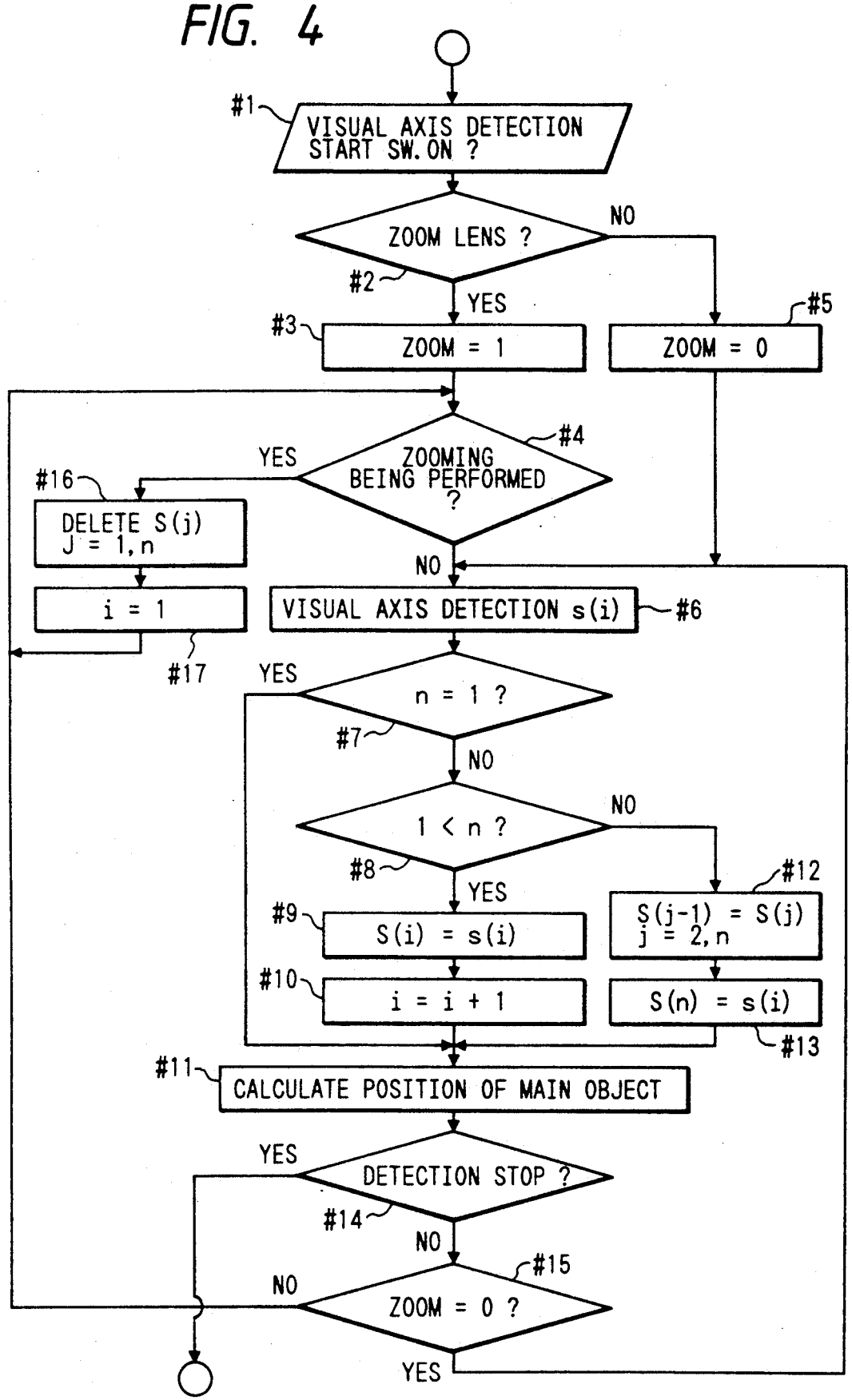
FIG. 4 is a flowchart showing a line of sight detection.
Figure 5A:
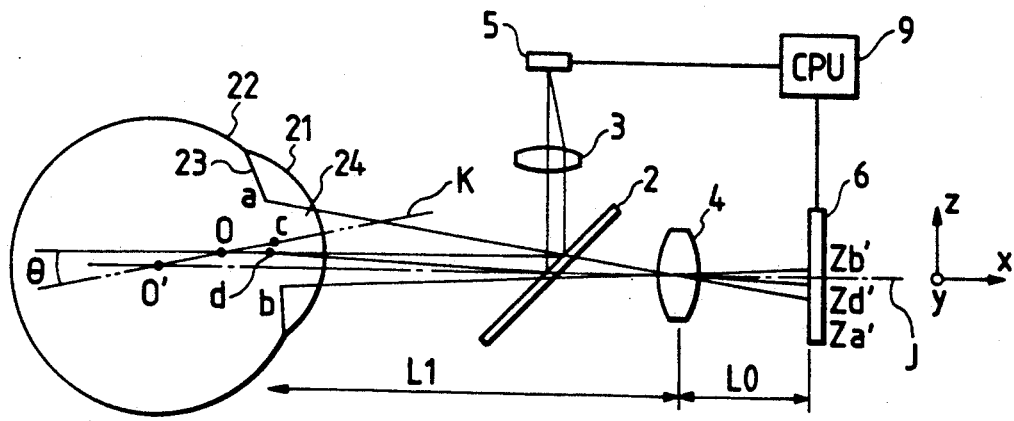
FIG. 5A is a schematic diagram of a line of sight detection optical system.
Figure 5B:
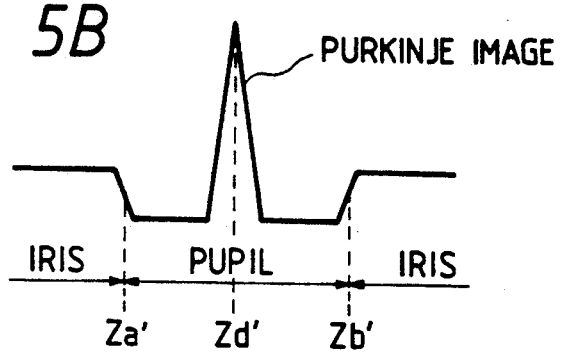
FIG. 5B is an output intensity diagram of a photoelectric conversion element array.
Figure 6:
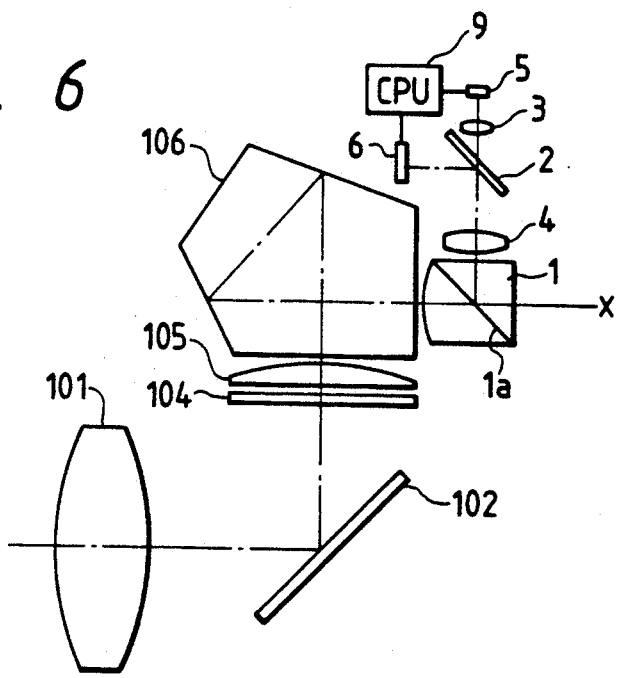

FIG. 4 is a flowchart to detect the line of sight of the camera having the visual axis detecting apparatus according to the embodiment. When the line of sight detection start switch SW associated with the camera main body or the photographing lens 101 is turned on (step #1), the camera controller 109 executes a communication with the memory section of the lens controller 110 of the photographing lens 101 and checks to see if the photographing lens 101 is a zoom lens or not (step #2). If it is determined that the lens 101 is the zoom lens (step #3), the camera controller 109 executes a communication with a zoom encoder section of the lens controller 110 and checks to see if the photographing lens is performing the zooming operation or not (step #4). If it is decided that the photographing lens 101 is not executing the zooming operation, the camera controller 109 sends a line of sight detection start signal to the CPU 9, thereby starting the line of sight detection (data s(i)) (step #6). On the contrary, if it is determined that the photographing lens 101 is not the zoom lens (step #5), the camera controller 109 soon sends the line of sight detection start signal to the CPU 9, thereby performing the gazing axis detection (data s(i)) (step #6). In the CPU 9, a threshold value n of the number of line of sight detection times has been preset. When n=1 (step #7), the position of the main object is soon calculated (step #11) after the line of sight was detected (step #6). The number n of detection times is set to a value of 1 or more which is determined on the basis of a time or the like which is needed to extract the main object from the motion of the line of sight.

If n is larger than 1 (step #7), the line of sight detection data s(i) is stored as data S(i) into the memory section of the CPU 9 (step #9) so long as the number i of line of sight detection times is smaller than the predetermined number of times n (step #8). Further, the CPU 9 increases the number i of line of sight detection times by +1 (step #10) and calculates a position P of the main object (step #11) on the basis of the data S(i) stored in the memory section. If the number i of line of sight detection times is equal to the predetermined number of times n (step #8), the data S which has been stored so far in the memory of the CPU 9 is replaced to s(j−1)=S(j) (j is set to a value within a range from 2 to n) (step #12). The latest line of sight detection data s(i) is stored as data S(n) into the memory of the CPU 9 (step *13). The position P of the main object is calculated on the basis of the data S(i) which has been replaced and stored (step #11).

The calculated position information of the main object is sent from the CPU 9 to the camera controller 109. If the photographer has already turned off the line of sight detection start switch or turned on a shutter release switch during such a period of time, the controller 109 sends a visual axis detection stop signal to the CPU 9, thereby stopping the line of sight detection (step #14). If the shutter release switch has been turned on, the controller 109 allows a focus detection area corresponding to the detected position P of the main object to be displayed in the finder by the display device 103. The controller 109 also receives the focus adjustment information of the focus detection area from the multi point focus detecting apparatus 108 and, further, sends the focus adjustment information to the lens controller 110, thereby executing the focus adjustment of the photographing lens 101.

On the other hand, when the line of sight detection is not stopped (step #14), the line of sight detection is continued (step #6) so long as the photographing lens 101 is not the zoom lens (step #15).

If the lens 101 is the zoom lens (step #15), the camera controller 109 again executes the communication with the zoom encoder section of the lens controller 110 and checks to see if the photographing lens is executing the zooming operation or not (step #4). If it is determined that the lens 101 is performing the zooming operation, the line of sight detection is stopped and the data (Sj) (j is set to a value within a range from 1 to n) which has been stored so far in the memory of the CPU 9 is erased (step #16). The number i of line of sight detection times is set to 1 (step #17). The camera controller 109 again communicates with the zoom encoder section of the lens controller 110 and checks to see if the photographing lens is executing the zooming operation or not (step #4). If the photographing lens 101 is performing the zooming operation, the line of sight detection is continued. However, even if the line of sight information at this time is not used, an almost similar effect can be obtained.

In the diagrams, an example in which the eyeball of the observer rotates in the Z-X plane (e.g., horizontal plane) has been shown. However, the line of sight be also similarly detected in the case where the eyeball of the observer rotates in the X-Y plane (for example, vertical plane).

According to the embodiment, since the discriminating means for discriminating whether the photographing lens is the zoom lens or not is also provided, the invention can be applied to any lens system. If the photo lens is not the zoom lens, the line of sight detection can be soon started, so that the embodiment is convenient.

As mentioned above, according to the first embodiment, since the line of sight detecting apparatus is provided, the camera can easily know which position on the observing surface the observer or photographer is observing in a manner similar to the conventional apparatus. Since the zooming operation detecting means is also provided, when it is detected that the lens is executing the zooming operation, the control means stops the line of sight detection. Thus, it is prevented that the camera is erroneously controlled on the basis of the line of sight information derived during the zooming operation.

On the other hand, when the detecting means detects ion of the zooming operation by the zooming lens, the arithmedic operating means resets the line of sight detection information which has been stored before the zooming operation, so that there is an effect such that the position of the main object after completion of the zooming operation can be accurately detected.

The second embodiment will now be described.

Figure 7:
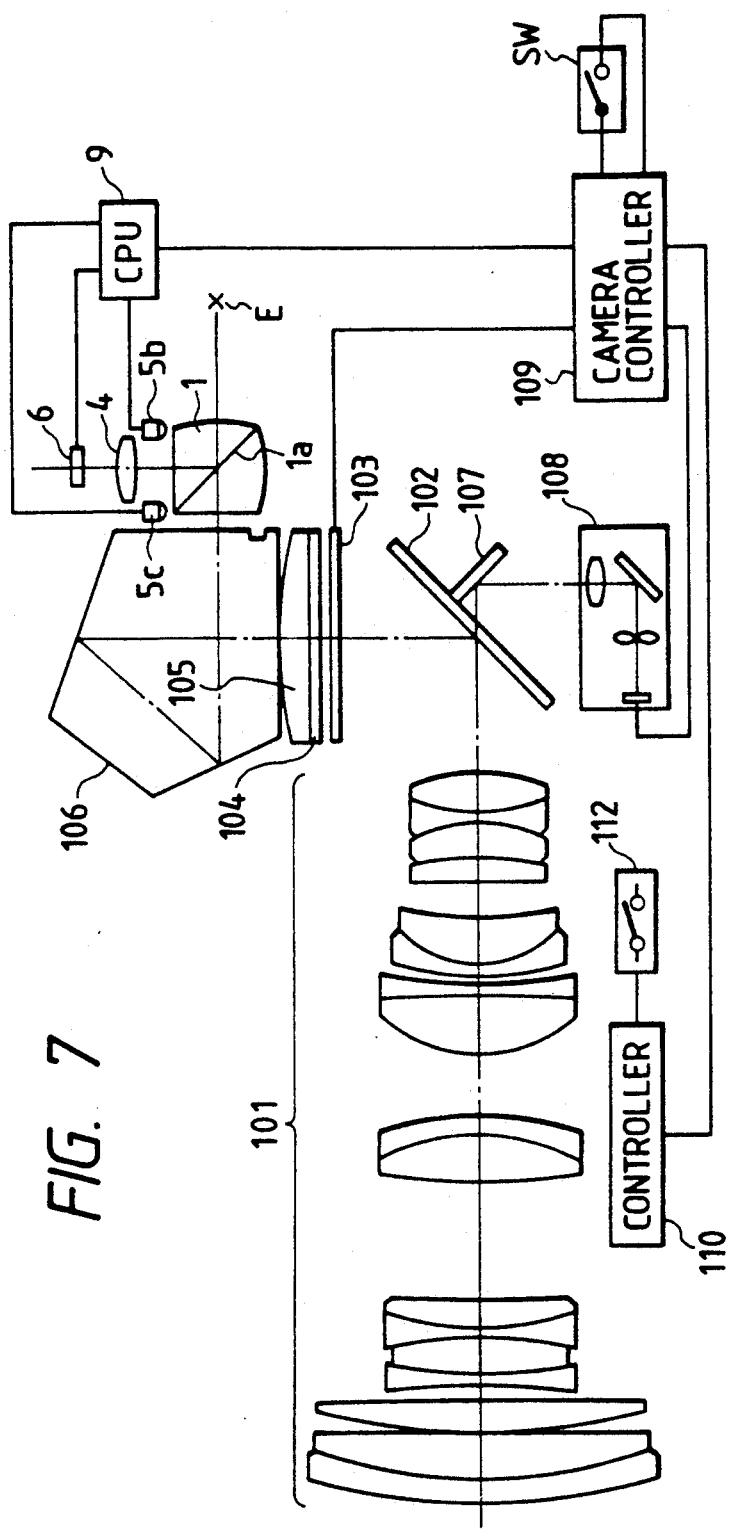
FIG. 7 is a schematic diagram of a single-lens reflex camera according to the second embodiment.

FIG. 7 is a schematic diagram of a single-lens reflex camera according to the second embodiment and differs from FIG. 1A with respect to a point that a focusing mode change-over switch 112 is added. The switch 112 can switch between the automatic focusing (AF) mode and the manual focusing (MF) mode.

Figure 8:
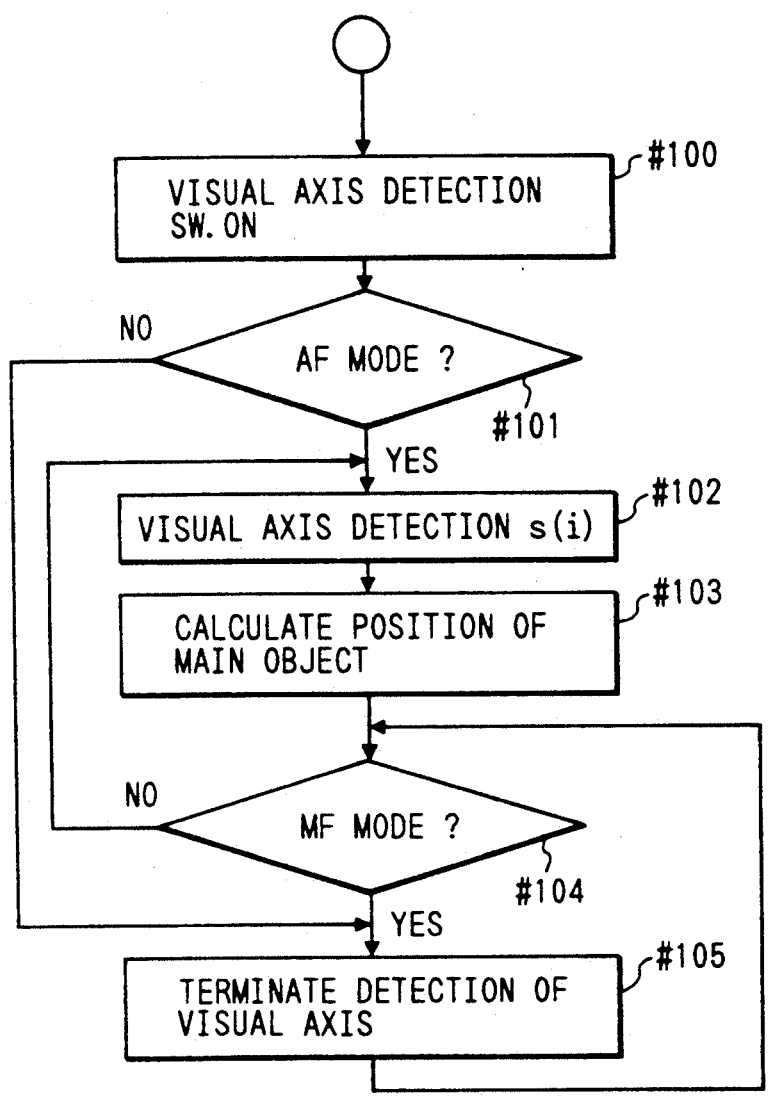
FIG. 8 is a flowchart of the second embodiment.

The operation of the second embodiment will now be described with reference to a flowchart of FIG. 8.

When the line of sight detection start switch SW associated with the camera main body or the photographing lens 101 is turned on (step #100), the camera controller 109 detects a setting state of the focusing mode change-over switch 112 of the photographing lens 101 through the lens controller 110 and checks to see if the photographing lens 101 has been set into the AF mode or not (step #101). If it is determined that the switch 112 of the lens 101 has been set into the AF mode, the camera controller 109 sends the line of sight detection start signal to the CPU 9, thereby starting the line of sight detection (data s(i)) (step #102). The detected line of sight s(i) is stored into the memory of the CPU 9. The position P of the main object is calculated on the basis of the stored line of sight s(i) (step #103). The calculated position information of the main object is transferred to the camera controller 109 from the CPU 9. If the photographer has already executed the pre-stroke operation of the shutter release button during such a period of time, the camera controller 109 allows the focus detection area corresponding to the detected position P of the main object to be displayed in the finder by the display device 103. The camera controller 109 also receives the focus adjustment information of the focus detection area from the multi point focus detecting apparatus 108 and, further, sends the focus adjustment information to the lens controller 110, thereby executing the focus adjustment of the photographing lens 101. In addition, a releasing operation of the shutter is performed. The camera controller 109 also detects a setting state of the focusing mode change-over switch 112 of the photographing lens 101 through the lens controller 110. If the switch 112 is held in the AF mode (step #104), the visual axis detection is continued (step #102).

If it is detected that the switch 112 has been switched to the MF mode (step #104), the camera controller 109 sends the line of sight detection stop signal to the CPU 9, thereby stopping the line of sight detection (step #105) The stop of the line of sight detection in step 105 incorporates both of the idea such that the line of sight detecting operation itself is stopped and the idea such that although the detecting operation is continued, the line of sight detection information is not used for at least the automatic focusing control. When the line of sight detection start switch SW associated with the camera main body or the photographing lens 101 is turned on (step #100), the camera controller 109 detects a setting state of the focusing mode change-over switch 112 of the photographing lens 101 through the lens controller 110 and checks to see if the lens 101 has been set into the AF mode or not. If the switch 112 of the lens 101 is not set to the AF mode (that is, the switch 112 has been set into the MF mode) (step #101), the camera controller 109 doesn't execute the line of sight detection (#105) because the line of sight information is unnecessary in the MF mode.

In the second embodiment, an example in which the focusing mode change-over switch 112 is switched between the automatic focusing mode and the manual focusing mode has been shown. However, in the case where the switch 112 is switched between the automatic focusing mode and the power focusing (PF) mode (mode in which the photographer electrically moves the photographing lens while observing the finder screen, thereby executing the focusing operation) as well, it is sufficient to stop the line of sight detection in the case where the switch has been set into the PF mode in a manner similar to the above.

Although the second embodiment has been shown and described with respect to an example which the focusing mode change-over switch 112 is provided for the photographing lens, it can be also provided for the camera main body.

Figure 9:
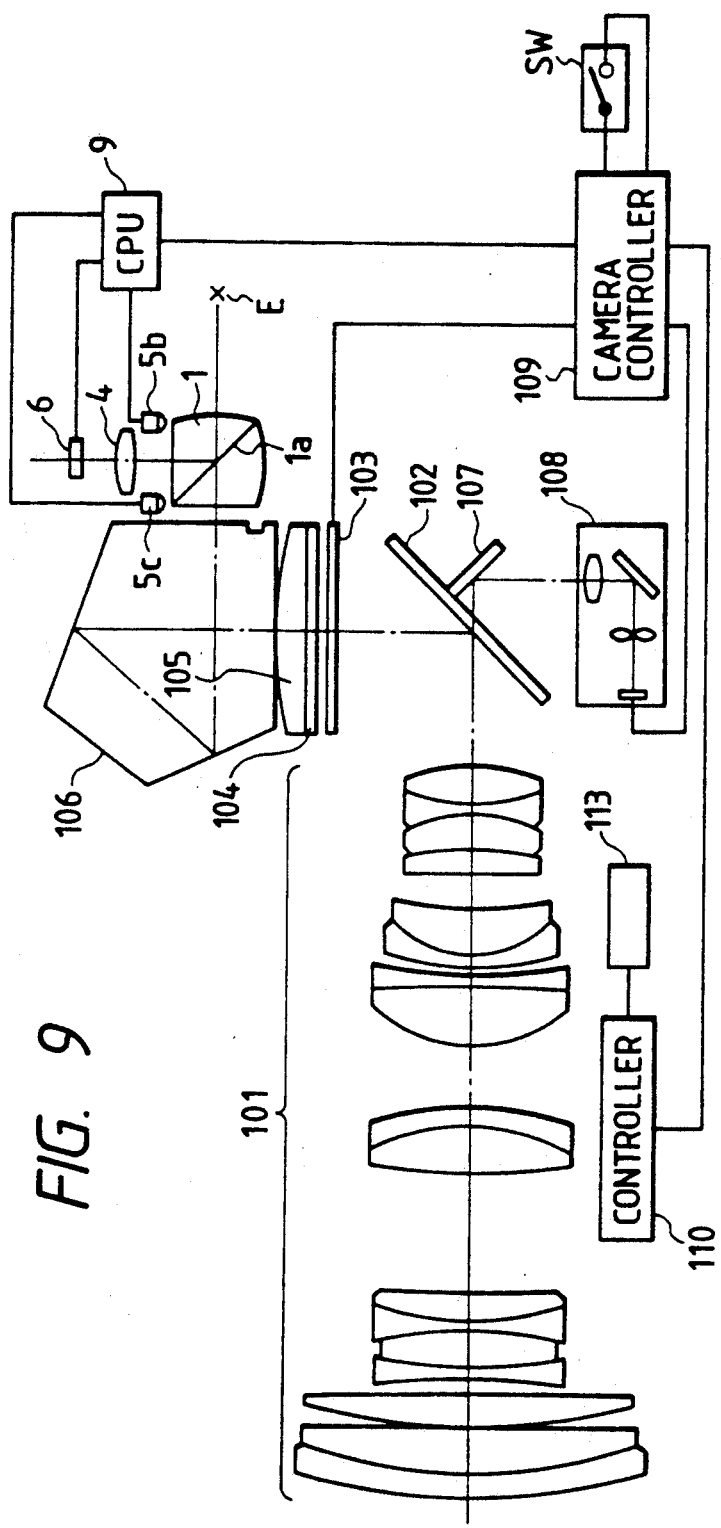
FIG. 9 is a schematic diagram of a single-lens reflex camera according to the third embodiment.
Figure 10:
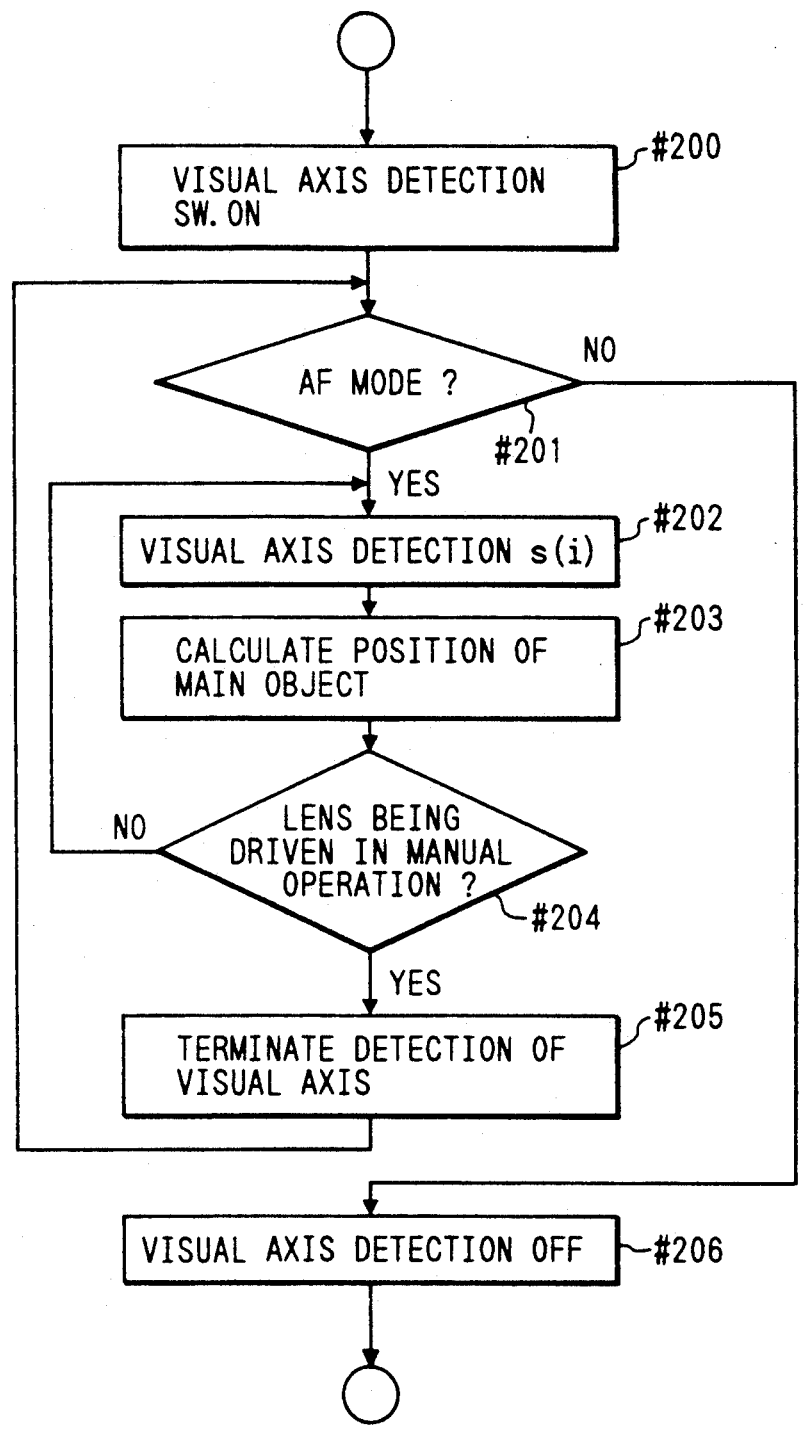
FIG. 10 is a flowchart of the third embodiment.

FIGS. 9 and 10 relate to the third embodiment of the invention. FIG. 9 is a schematic diagram of a single-lens reflex camera. FIG. 10 is a flowchart to detect the line of sight. In FIG. 9, the same parts and components as those shown in FIG. 1A are designated by the same reference numerals. Reference numeral 113 denotes an encoder to detect that the photographing lens is being driven. The operation will now be described with reference to FIG. 10.

When the line of sight detection switch SW associated with the camera main body or the photographing lens 101 is turned on (step #200), the camera controller 109 detects a set focusing mode of the camera (step #201). If it is determined that the photographing lens 101 has been set into the AF mode, the camera controller 109 sends the line of sight detection start signal to the CPU 9, thereby executing the line of sight detection (data s(i)) (step #202). The detected visual axis data s(i) is stored into the memory of the CPU 9. The position P of the main object is calculated (step #203) on the basis of the stored line of sight data s(i). The calculated position information of the main object is sent from the CPU 9 to the camera controller 109. If the photographer has already executed the pre-stroke operation of the shutter release button during such a period of time, the camera controller 109 allows the focus detection area corresponding to the detected position P of the main object to be displayed in the finder by the display device 103. The camera controller 109 also receives the focus adjustment information of the focus detection area from the multi point focus detecting apparatus 108 and, further, sends the focus adjustment information to the lens controller 110, thereby executing the automatic focus adjustment of the photographing lens 101. Since there is a camera which can execute a manual focusing operation by the manual operation of the photographer after completion of the automatic focus adjustment of the photographing lens 101, the camera controller 109 further detects a signal of the encoder 113 provided for the photographing lens 101 through the lens controller 110. On the basis of the signal from the encoder 113, if it is detected that the photographing lens 101 is not driven by the manual operation (step #204), the line of sight detection is continued (step #202).

From the signal of the encoder 113, if it is detected that the lens 101 is being driven by the manual operation (step #204), the camera controller 109 sends the line of sight detection stop signal to the CPU 9, thereby stopping the line of sight detection (step #205). Not only the case where the line of sight detection is s but also the case where the line of sight detection information is not used are included as an embodiment in a manner similar to the second embodiment. After the elapse of a predetermined time after the stop of the line of sight detection, or when the photographer executes a release post-stroke operation, the camera controller 109 again detects the set focusing mode of the camera (step #201). If the camera has been set into the AF mode, the camera controller 109 sends the line of sight detection start signal to the CPU 9, thereby executing the line of sight detection (step #202).

When the line of sight detection switch SW associated with the camera main body or the photographing lens 101 is turned on (step #200), the camera controller 109 detects a set focusing mode of the camera. If the photographing lens 101 is not set into the AF mode (that is, if it has been set into the MF mode) (step #201), the camera controller 109 turns off the line of sight detection (#206) without executing the line of sight detection because the line of sight information is unnecessary in the MF mode. That is, the camera controller 109 sets the same state as the case where the line of sight detection switch SW is off.

Figure 11:
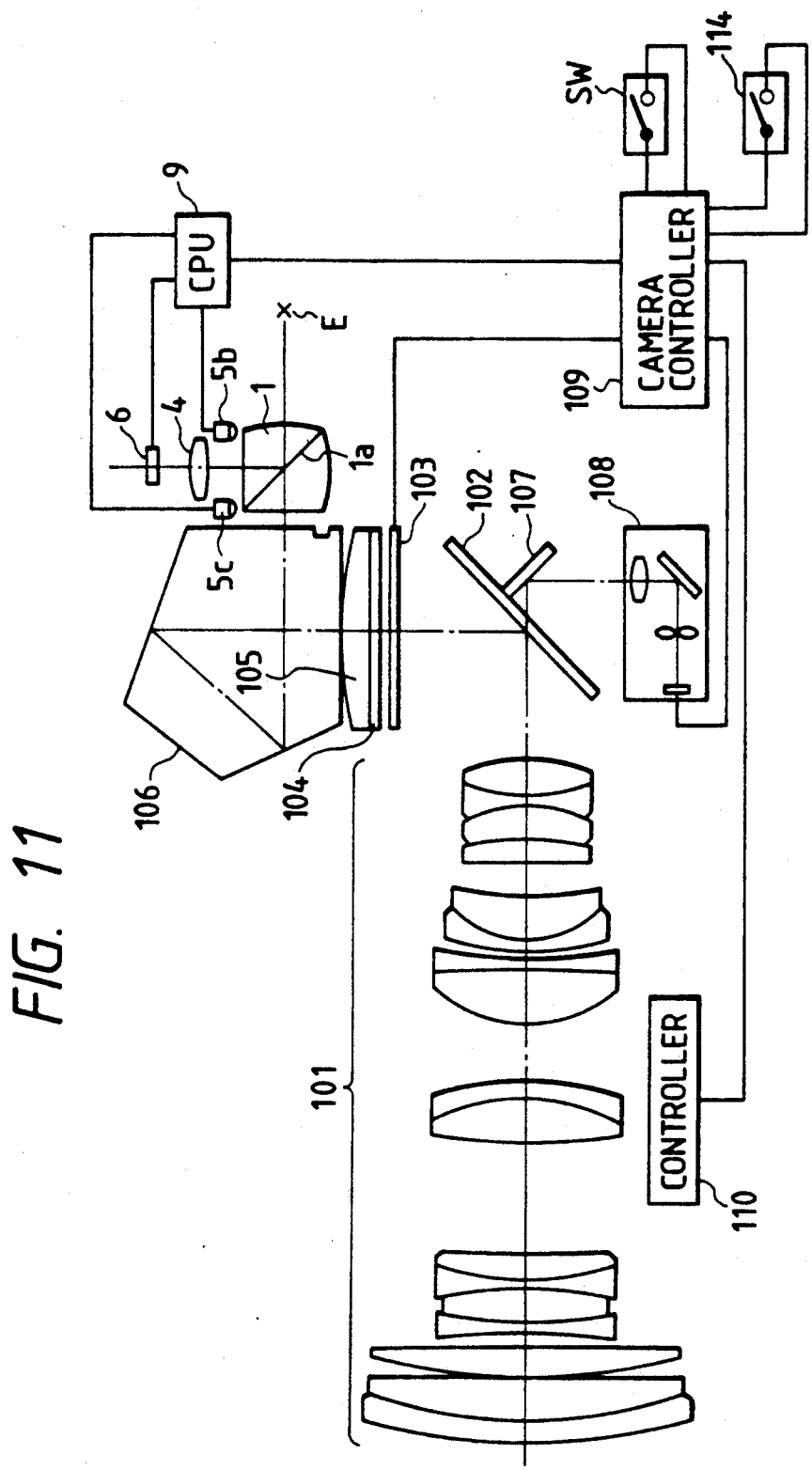
FIG. 11 is a schematic diagram of a single-lens reflex camera according to the fourth embodiment.

FIGS. 11 and 12 relate to the fourth embodiment of the invention. FIG. 11 is a schematic diagram of a single-lens reflex camera. FIG. 12 is a flowchart for the line of sight detection. In FIG. 11, the same parts and components as those shown in FIG. 1A are designated by the same reference numerals. Reference numeral 114 denotes a power focusing switch. The operation will now be described with reference to FIG. 12.

When the line of sight detection switch SW associated with the camera main body or the photographing lens 101 is turned on (step #300), the camera controller 109 detects a set focusing mode of the camera (step #301). If it is determined that the photographing lens 101 has been set into the AF mode, the camera controller 109 sends the line of sight detection start signal to the CPU 9, thereby executing the line of sight detection (data s(i)) (step #302). The detected line of sight data s(i) is stored into the memory of the CPU 9. The position P of the main object is calculated on the basis of the stored line of sight data s(i) (step #303). The calculated position information of the main object is sent from the CPU 9 to the camera controller 109. If the photographer has already executed the pre-stroke operation of the shutter release button during such a period of time, the camera controller 109 allows the focus detection area corresponding to the detected position P of the main object to be displayed in the finder by the display device 103. The camera controller 109 also receives the focus adjustment information of the focus detection area from the multi point focus detecting apparatus 108 and, further, sends the focus adjustment information to the lens controller 110, thereby executing the automatic focus adjustment of the photographing lens 101. However, since there is a case where during the automatic focus adjustment or after completion of the automatic focus adjustment of the photographing lens 101, the photographer forcedly turns on the power focusing switch 114 and drives the lens 101, the camera controller 109 always detects the setting state of the power focusing switch 114. If it is detected that the power focusing, switch 114 is off (step #304), the line of sight detection is continued (step #302). If it is detected that the power focusing switch 114 has been turned on (step #304) and that the photographing lens 101 is, for instance, electrically being driven, the, camera controller 109 sends the line of sight detection stop signal to the CPU 9, thereby stopping the line of sight detection (step #305). The case where the line of sight detection information is not used is also incorporated as an embodiment similarly to the second embodiment. After the elapse of a predetermined time after the stop of the line of sight detection, or when the photographer executes the post-stroke operation of the release button, the camera controller 109 again detects the set focusing mode of the camera (step #301). If the camera has been set into the AF mode, the camera controller 109 sends the line of sight detection start signal to the CPU 9, thereby executing the line of sight detection (step #302).

When the line of sight detection switch SW associated with the camera main body or the photographing lens 101 is turned on (step #300), the camera controller 109 detects the set focusing mode of the camera. If it is decided that the photographing lens 101 is not set into the AF mode (that is, if it has been set into the manual focusing mode or the power focusing mode) (step #301) the camera, controller 109 doesn't execute the line of sight detection because the visual axis detection information is unnecessary in the MF mode or PF mode (step #305).

Although the embodiment has been shown and described with respect to an example in which the power focusing switch 114 is provided for the camera main body, it can be also provided for the photographing lens 101.

As described above, according to the second to fourth embodiments, in the camera having the line of sight detecting apparatus for detecting a line of sight of the observer who observes the finder, there is provided the means for stopping the line of sight detection or inhibiting the use of the line of sight detection information when it is detected that the lens attached to the camera has been set into the manual focusing mode or the power focusing mode, so that there is an effect such that the operation of the camera by the photographer can be facilitated.

Further, according to the second to fourth embodiments, there is provided the means for stopping the line of sight detection or for inhibiting the use of the line of sight detection information when it is detected that the lens attached to the camera is in the manual focusing state or the power focusing state, so that there is an effect such that the operation of the camera by the photographer can be made easy.

The fifth embodiment will now be described.

Figure 13A:
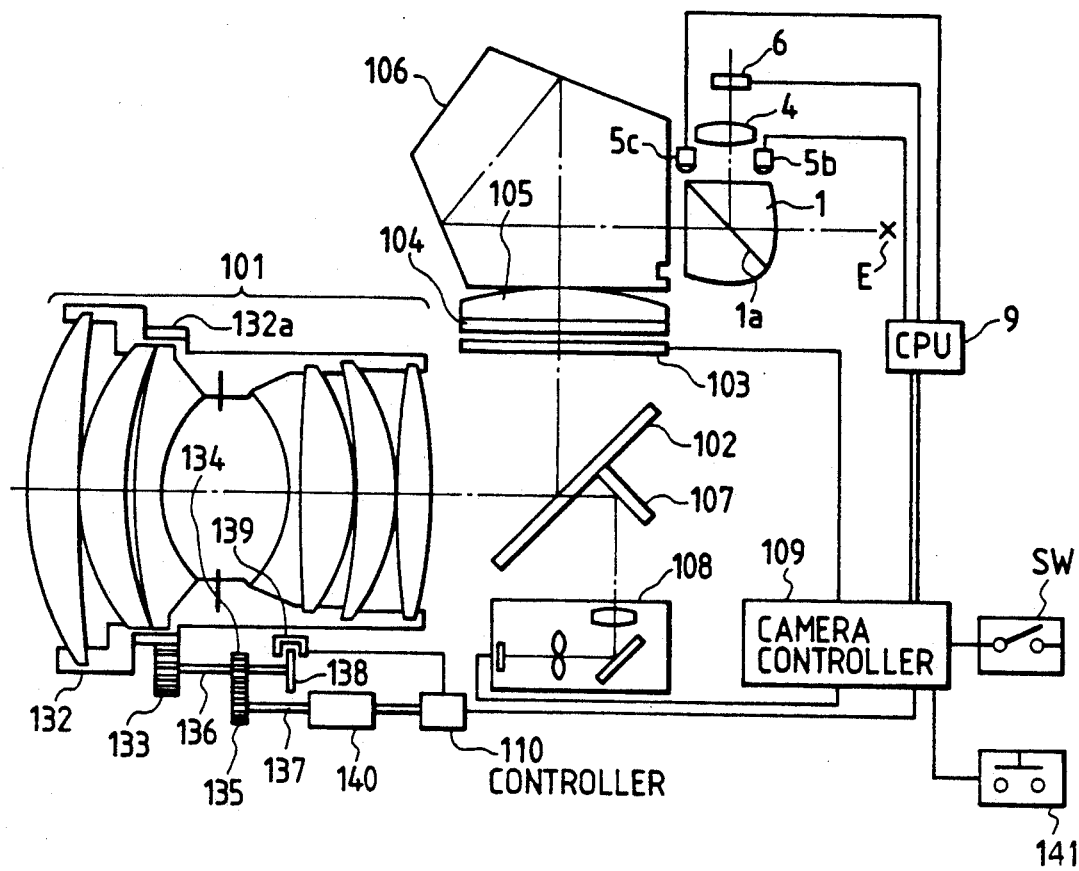
FIG. 13A is a schematic diagram of a single-lens reflex camera according to the fifth embodiment.
Figure 13B:
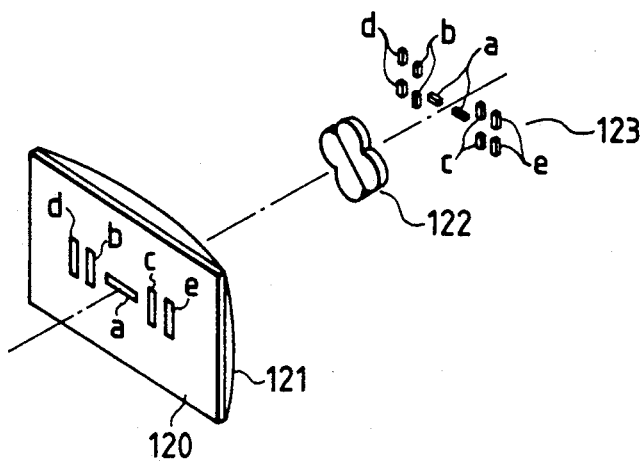
FIG. 13B is a perspective view of a main section of a focal point detecting apparatus according to the fifth embodiment.

FIG. 13A is a schematic diagram of a single-lens reflex camera according to the fifth embodiment. FIG. 13B is a perspective view of a main section of a focal detecting apparatus. Portions different from the foregoing first embodiment will be described hereinbelow.

Reference numeral 132 denotes a lens frame with a helicoid gear; 133, 134, and 135 gears; 136 and 137 shafts; 138 an encoder; 139 a photo interrupter; 140 a motor; 141 a release switch which can be operated by two strokes. The camera controller 109 also functions as control means for stopping the line of sight detection.

Since the explanation of the multi point focus detecting apparatus 108 is unnecessary to understand the invention, only a schematic description will be made. As shown in FIGS. 13A and 13B, the visual field mask 120 having a plurality of slits a to e which are arranged near the presumed image forming surface of the photographing lens 101 and determine the focus detection areas and the lens member 121 serving as a field lens for the image in each slit are closely arranged. Further, a set of image re-forming lenses 122 and a set of photoelectric conversion element arrays 123 (practically speaking, the arrays a to e) as many as the number of slits are sequentially arranged. The slits, field lens, set of image re-forming lenses, and set of photoelectric conversion element arrays comprise the well-known focus detection system, thereby enabling the focal point to be solely detected by every set. A part of the object light transmitted through the photographing lens 101 passes through the lift-up mirror 102 and is reflected by the sub mirror 107 and is led to the multi point focus detecting apparatus 108 arranged in the bottom portion of the camera main body. The multi point focus detecting apparatus 108 detects the focusing states of the areas a to e corresponding to the focus detection area signals on the basis of the focus detection area signals generated from the camera controller 109.

Figure 14:
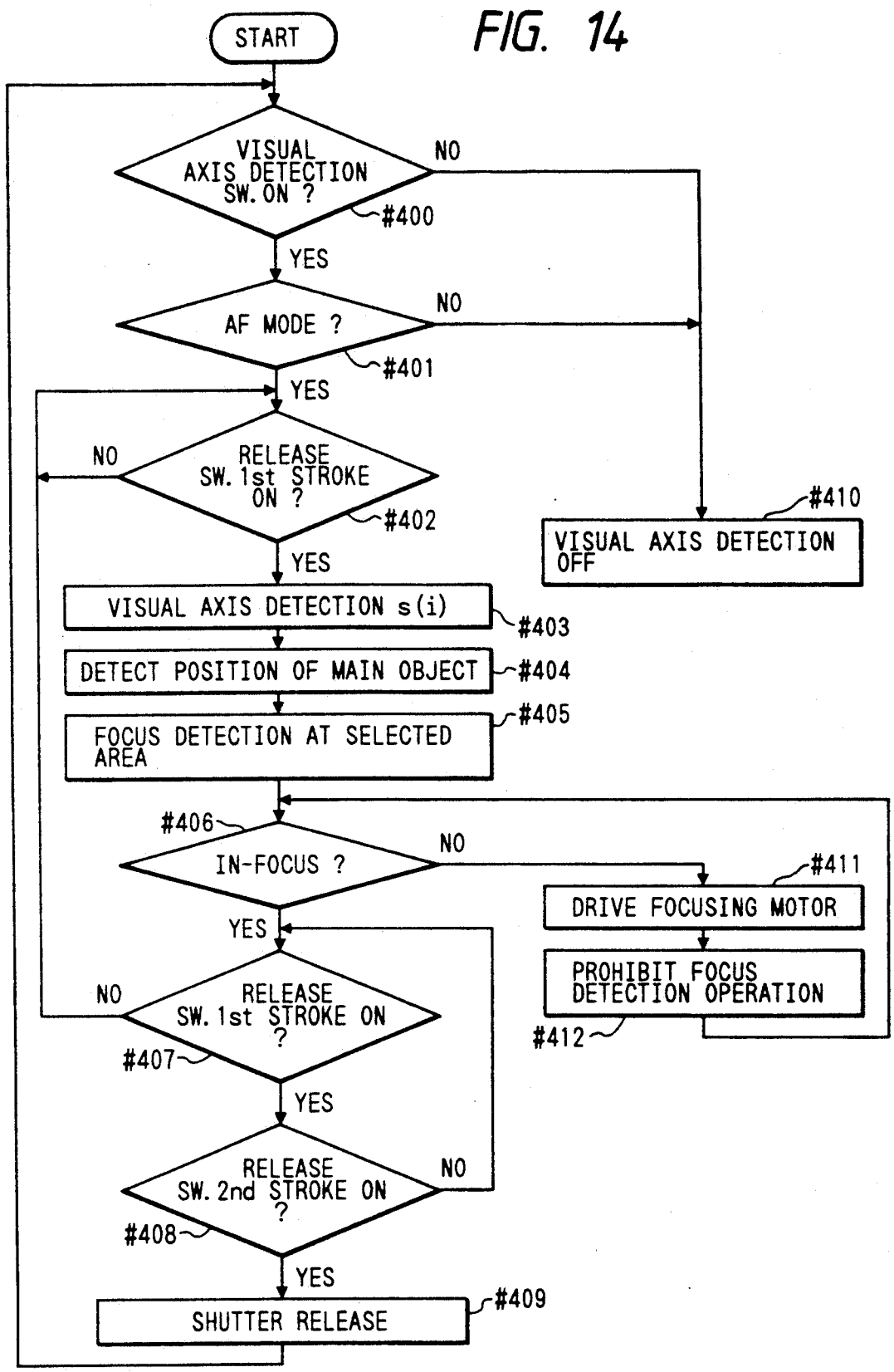
FIG. 14 is a flowchart of the fifth embodiment.

FIG. 14 is a flowchart showing the focus adjusting operation of the lens of the camera having the gazing axis detecting appartus according to the fifth embodiment. When the line of sight detection switch SW associated with the camera main body or the photographing lens 101 is turned on (step #400), the camera controller 109 detects the set focusing mode of the photographing lens 101 through the lens controller 110, thereby checking to see if the lens 101 has been set into the AF mode or not (step #401). If it is determined that the lens 101 is not set into the AF mode (step #401), the camera controller 109 turns off the line of sight detecting operation irrespective of the switching state of the switch SW and doesn't execute the line of sight detection (step #410) or doesn't use the line of sight detection information.

If it is determined that the photographing lens 101 has been set into the AF mode (step #401), the camera is set into the standby mode until the first-stroke operation of the shutter release switch 141 is executed (step #402). If the first-stroke operation of the shutter release switch 141 has been performed, the camera controller 109 sends the line of sight detection start signal to the CPU 9, thereby executing the line of sight detection (data s(i)) (step #403). The detected visual axis data s(i) is stored into the memory of the CPU 9. On the basis of the stored line of sight data s(i), the position P of the main object is calculated (step #404). The calculated position information of the main object is sent from the CPU 9 to the camera controller 109. The camera controller 109 allows the focus detection area (at least one of the areas a to e) corresponding to the detected position P of the main object to be displayed in the finder by the display device 103. The camera controller 109 also discriminates whether the photographing lens 101 is in an in-focus state or not on the basis of the focus adjustment information of the focus detection area whose focal point has been detected by the multi point focus detecting apparatus 108 (step #406). If it is determined that the photographing lens 101 is not in the in-focus state (step #406), the camera controller 109 sends the focus adjustment information to the lens controller 110, thereby executing the focus adjustment of the photographing lens 101. At this time, lens controller 110 which has received the focus adjustment information from the camera controller 109 sends a signal to the motor 140, thereby rotating the motor 140 in the in-focus direction. The driving force of the motor 140 is transferred to the shaft 137 and the gear 135 coupled thereto. The driving force of the motor 140 is further transferred to the lens frame 132 through the gear 134 engaged with the gear 135, the shaft 136 coupled to the gear 134, and the gear 133 coupled to the shaft 136. The lens frame 132 has a helicoid gear 132a. In association with the rotation of the motor 140, the lens frame 132 moves so as to be away from the camera main body, so that the photographing lens is focus-adjusted (step #411). That is, the focusing operation is executed by projecting the entire lens frame. The encoder 138 is coupled to one end of the shaft 136. The motion of the encoder 138 is detected by the photo interrupter 139. A movement amount of the photographing lens 101 can be detected by a signal from the photo interrupter 139, so that the in-focus state can be accurately rapidly obtained. When the photographing lens 101 is driven, the camera controller 109 inhibits the line of sight detecting operation (step #412) or doesn't use the line of sight detection information.

When the focus-detection of the focus detection area corresponding to the position of the main object is executed from the position information of the main object and if it is determined that the photographing lens 101 is in the in-focus state in the focus detection area (step #406), the camera controller 109 stops the driving of the motor 140 and then checks to see if the first-stroke operation of the shutter release switch 41 has been executed or not (step #407). At this time, if the first-stroke operation of the shutter release switch 141 is not performed, the operating mode is returned to the initial operation and the camera is set into the standby mode until the first-stroke operation of the shutter release switch 141 is executed (step #402). On the other hand, if the first-stroke operation of the shutter release switch 141 has been executed (step #407), the camera controller 109 further checks to see if the second-stroke operation of the shutter release switch 141 has been performed or not (step #408). If the second-stroke operation of the shutter release switch 141 has been performed, the shutter releasing operation (the backward moving operation of the mirror, the opening/closing operation of the shutter) is executed and the object is photographed (step #409).

After the in-focus state was detected in step #406, the inhibiting state of the line of sight detecting operation is continued so long as the first-stroke operation of the shutter release switch 141 is cancelled.

Figure 15:
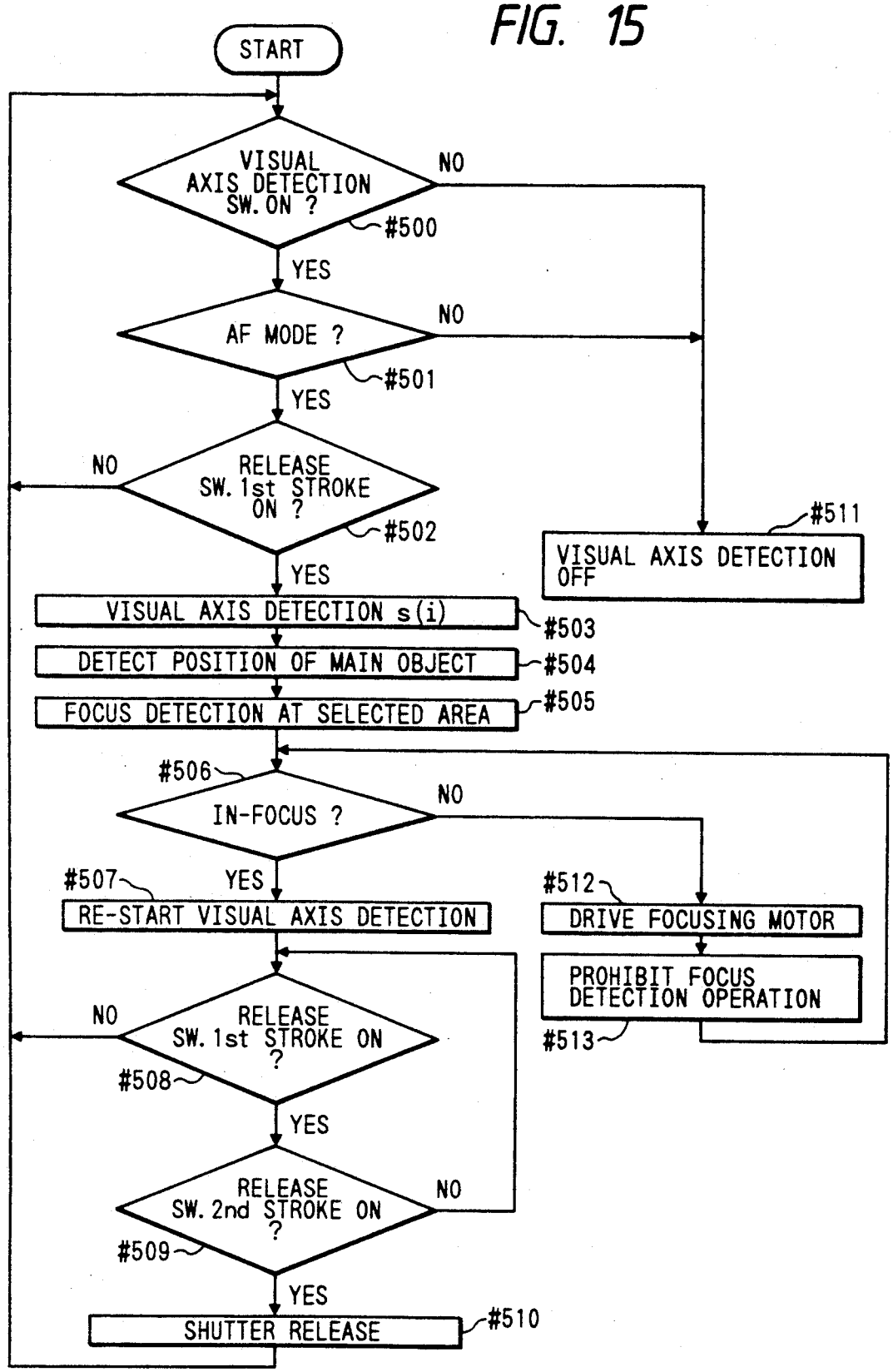
FIG. 15 is a flowchart of the sixth embodiment.

FIG. 15 relates to the sixth embodiment of the invention and shows a flowchart of the focus adjusting operation of the lens. Since a construction of a camera which is used in the sixth embodiment is the same as that shown in the fifth embodiment, its explanation is omitted.

When the line of sight detection switch SW associated with the camera main body or the photographing lens 101 is turned on (step #500), the camera controller 109 detects a setting state of the focusing mode through the lens controller 110 and checks to see if the photographing mode has been set into the AF mode or not (step #501). If it is determined that the photographing lens is not set into the AF mode (step #501), the camera controller 109 doesn't execute the line of sight detection irrespective of the turn-on of the line of sight detection switch SW (step #512) or doesn't use the visual axis detection information.

If it is decided that the photographing lens has been set into the AF mode (step #501), the camera is set into the standby mode until the first-stroke operation of the shutter release switch 141 is executed (step #502). If the first-stroke operation of the shutter release switch 141 has been executed, the camera controller 109 sends the line of sight detection start signal to the CPU 9, thereby executing the line of sight detection (data s(i)) (step #503). The detected line of sight data s(i) is stored into the memory of the CPU 9. The position P of the main object is calculated on the basis of the stored line of sight data s(i) (step #504). The calculated position information of the main object is sent from the CPU 9 to the camera controller 109. The camera controller 109 allows the focus detection areas a to e corresponding to the detected position P of the main object to be displayed in the finder by the display device 103 and also checks to see if the photographing lens 101 is in the in-focus state or not on the basis of the focus information of the focus area (step #506). If it is decided that the photographing lens 101 is not in the in-focus state (step #506), the camera controller 109 sends the focus adjustment information to the lens controller 110, thereby executing the focus adjustment of the lens 101. At this time, the lens controller 110 which has received the focus adjustment information from the camera controller 109 sends a signal to the motor 140, thereby rotating the motor 140. The driving force of the motor 140 is transferred to the shaft 137 and the gear 135 coupled thereto. Further, the driving force of the motor 140 is transferred to the lens frame 132 through the gear 134 engaged with the gear 135, the shaft 136 coupled to the gear 134, and the gear 133 coupled to the shaft 136. The lens frame 132 has the helicoid gear 132a. In association with the rotation of the motor 140, the lens frame 132 moves so as to be away from the camera main body, so that the focus adjustment of the photographing lens is performed (step #512) That is, the focusing operation is performed by projecting the entire lens frame. The encoder 138 is coupled to one end of the shaft 136. The operation of the encoder 138 is detected by the photo interrupter 139. A movement amount of the photographing lens 101 can be detected by a signal from the photo interrupter 139, so that the in-focus state can be accurately promptly obtained.

The focus detection of the focus detection area corresponding to the position of the main object is performed from the position information of the main object (step #505). If it is determined that the photographing lens 101 is in the in-focus state in the photographing area in the focus detection area, the camera controller 109 restarts the line of sight detecting operation (steps #503 and #504) (step #507). Further, a check is made to see if the first-stroke operation of the shutter release switch 141 is continuing or not (step #508). If the first-stroke operation of the shutter release switch 141 has been released, the operating mode is returned to the initial operation and the camera is set into the standby mode until the next first-stroke operation of the shutter release switch 141 is executed (step #502). If the first-stroke operation of the shutter release switch 141 has been performed (step #508), the camera controller 109 further checks to see if the second-stroke operation of the shutter release switch 141 has been executed or not (step #509). If the second-stroke operation of the shutter release switch 141 has been performed, the shutter is released and the object is photographed (step #510).

In the case of the embodiment, after the in-focus state was obtained, the line of sight detecting operation is restarted and the focus detection area is displayed in the finder by the display device 103.

As described above, according to the fifth and sixth embodiments, in the camera having the line of sight detecting apparatus to detect the line of sight of the observer who observes the finder, if it is determined that the focusing lens is being driven on the basis of the information, from the focus detecting means, the line of sight detecting operation is prohibited or the line of sight detection information is not used. Thus, there is an effect such that an erroneous line of sight detection can be prevented. In addition, by inhibiting the line of sight detecting operation, a consumption of energy by the camera can be reduced.

We claim:

1. A camera having a detecting apparatus for detecting a line of sight of an observer, comprising:
   (a) a lens device having a movable lens;
   (b) judgment means for judging a moving state of the movable lens device; and
   (c) control means for making a detecting operation of the line of sight by said detecting apparatus different as compared with a state in which the movable lens is not moved when it is judged by said judgment means that the movable lens is moving.

2. A camera according to claim 1, wherein said control means stops the detecting operation of the line of sight by the detecting apparatus when the movable lens is moving.

3. A camera according to claim 1, wherein the control means does not use information of the detecting operation of the line of sight by the detecting apparatus for a camera control when the movable lens is moving.

4. A camera according to claim 2, wherein said detecting apparatus includes:
   an illuminating element for illuminating an eyeball of the observer;
   a light receiving element for receiving a reflected light from the eyeball illuminated by said illuminating element; and
   a calculating circuit for calculating the line of sight of the observer from a reflection image of the eyeball received by said light receiving element.

5. A camera according to claim 3, wherein said detecting apparatus includes:
   an illuminating element for illuminating an eyeball of the observer;
   a light receiving element for receiving a reflected light from the eyeball illuminated by said illuminating element; and
   a calculating circuit for calculating the line of sight of the observer from a reflection image of the eyeball received by said light receiving element.

6. A camera according to claim 1, wherein the movable lens performs a zooming function by the movement.

7. A camera according to claim 3, wherein the movable lens performs a zooming function by the movement.

8. A camera according to claim 2, further comprising:
   means for resetting the sight line detection information stored before the movement of the movable lens when it is judged by the judgment means that the movable lens is moving.

9. A camera according to claim 6, further comprising:
   means for resetting the sight line detection information stored before the movement of the movable lens when it is judged by the judgment means that the movable lens is moving.

10. A camera according to claim 2, wherein the judgment means judges the movement of the movable lens by encoder information.

11. A camera according to claim 3, wherein wherein the judgment means judges the movement of the movable lens by encoder information.

12. A camera according to claim 2, wherein the line of sight detecting apparatus includes a switch for making the line of sight detection operative, and the control means stops the line of sight detecting operation when the movable lens is moving even if said switch has been operated so as to execute the line of sight detecting operation.

13. A camera according to claim 3, wherein the detecting apparatus includes a switch for making the sight line detection operative, and the control means does not use the information of the sight line detecting operation for the camera control when the movable lens is moving even if said switch has been operated so as to execute the sight line detecting operation.

14. A camera according to claim 1, further comprising a focus detecting apparatus for receiving the light which has been transmitted through said lens device and discriminating an in-focus state and executing a focus detection of a plurality of areas, and wherein said focus detecting apparatus executes the focus detection of a special area on the basis of the sight line information provided by the detecting apparatus.

15. A camera according to claim 2, further comprising a focus detecting apparatus for receiving the light which has been transmitted through said lens device and discriminating an in-focus state and executing a focus detection of a plurality of areas, and wherein said focus detecting apparatus executes the focus detection of a special area on the basis of the sight line information provided by the detecting apparatus.

16. A camera according to claim 3, further comprising a focus detecting apparatus for receiving the light which has been transmitted through said lens device and discriminating an in-focus state and executing focus detecting apparatus executes the focus detection of a special area on the basis of the sight line information provided by the detecting apparatus.

17. A camera according to claim 2, wherein the movable lens performs a focusing function by the movement.

18. A camera according to claim 3, wherein the movable lens performs a focusing function by the movement.

19. A camera according to claim 17, further comprising:
a focus detecting apparatus for receiving the light which has been transmitted through the lens device and discriminating an in-focus state.

20. A camera according to claim 18, further comprising:
a focus detecting apparatus for receiving the light which has been transmitted through the lens device and discriminating an in-focus state.

21. A camera according to claim 19, wherein the control means stops the sight line detecting operation when the movable lens is being moved in an in-focus direction by using the information of the focus detecting apparatus.

22. A camera according to claim 20, wherein the control means does not use the information of the sight line detecting operation for the camera control when the movable lens is being moved in an in-focus direction by using the information of the focus detecting apparatus.

23. A camera according to claim 19, wherein the control means stops the sight line detecting operation when the movable lens has manually been moved irrespective of the focus detecting apparatus.

24. A camera according to claim 20, wherein the control means does not use the information of the sight line detecting operation for the camera control when the movable lens has manually been moved irrespective of the focus detecting apparatus.

25. A camera according to claim 17, further comprising power focusing means for forcedly moving the movable lens by a motor,
and wherein said power focusing means includes a second switch for executing a power focusing operation.

26. A camera according to claim 18, further comprising power focusing means for forcedly moving the movable lens by a motor,
and wherein said power focusing means includes a second switch for executing a power focusing operation.

27. A camera according to claim 25, wherein the control means stops the sight line detecting operation when said second switch has been operated.

28. A camera according to claim 26, wherein the control means does not use the information of the sight line detecting operation for the camera control when said second switch has been operated.

29. A camera according to claim 1, wherein the detecting apparatus detects the line of sight of the observer in a finder to lead the light which has been transmitted through said lens device.

30. A camera according to claim 2, wherein the detecting apparatus detects the line of sight of the observer in a finder to lead the light which has been transmitted through said lens device.

31. A camera according to claim 3, wherein the detecting apparatus detects the line of sight of the observer in a finder to lead the light which has been transmitted through said lens device.

32. A camera according to claim 4, wherein the detecting apparatus detects the line of sight of the observer in a finder to lead the light which has been transmitted through said lens device.

33. A camera according to claim 5, wherein the detecting apparatus detects the line of sight of the observer in a finder to lead the light which has been transmitted through said lens device.

34. A camera according to claim 6, wherein the detecting apparatus detects the line of sight of the observer in a finder to lead the light which has been transmitted through said lens device.

35. A camera according to claim 7, wherein the detecting apparatus detects the line of sight of the observer in a finder to lead the light which has been transmitted through said lens device.

36. A camera according to claim 17, wherein the detecting apparatus detects the line of sight of the observer in a finder to lead the light which has been transmitted through said lens device.

37. A camera according to claim 18, wherein the detecting apparatus detects the line of sight of the observer in a finder to lead the light which has been transmitted through said lens device.

38. A camera having a detecting apparatus to detect a line of sight of an observer, comprising:
(a) a lens device having a focusing lens;
(b) judgment means for judging a moving state of said focusing lens in the lens device;
(c) an automatic focusing apparatus for receiving a light transmitted through the lens device and discriminating an in-focus state and moving the focusing lens to an in-focus position;

(d) a change-over switch for switching between an operative mode and an inoperative mode of said automatic focusing apparatus; and (e) control means for making a detecting operation of said line of sight different as compared with the case where the change-over switch has been switched to the operative mode when the change-over switch has been switched to the inoperative mode.

39. A camera according to claim 38, wherein when said change-over switch has been switehed to the inoperative mode, the control means stops the line of sight detecting operation by the detecting apparatus.

40. A camera according to claim 38, wherein when said change-over switch has been switched to the inoperative mode, the control means does not use the information of the sight line detecting operation by the detecting apparatus for the camera control.

41. A camera according to claim 39, wherein the detecting apparatus includes:
   an illuminating element for illuminating an eyeball of the observer;
   a light receiving element for receiving a reflected light from the eyeball illuminated by said illuminating element; and
   a calculating circuit for calculating the line of sight of the observer from a reflection image of the eyeball received by said light receiving element.

42. A camera according to claim 40, wherein the detecting apparatus includes:
   an illuminating element for illuminating an eyeball of the observer;
   a light receiving element for receiving a reflected light from the eyeball illuminated by said illuminating element; and
   a calculating circuit for calculating the line of sight of the observer from a reflection image of the eyeball received by said light receiving element.

43. A camera according to claim 39, wherein the detecting apparatus includes a switch for making the line of sight detection operative, and said control means stops the sight line detecting operation when said change-over switch has been switched to the inoperative mode even if said switch has been operated so as to execute the sight line detecting operation.

44. A camera according to claim 40, wherein the detecting apparatus includes a switch for making the line of sight detection operative, and said control means does not use the information of the line of sight detecting for the camera control when said change-over switch has been switched to the inoperative mode even if said switch has been operated so as to execute the line of sight detecting operation.

45. A camera according to claim 38, wherein said automatic focusing apparatus executes a focus detection of a plurality of areas and also performs a focus detection of a special area on the basis of the line of sight detection information provided by said detecting apparatus.

46. A camera according to claim 39, wherein said automatic focusing apparatus executes a focus detection of a plurality of areas and also performs a focus detection of special area on the basis of the line of sight detection information by said detecting apparatus.

47. A camera according to claim 40, wherein said automatic fccusing apparatus executes a focus detection of a plurality of areas and also performs a focus detection of a special area on the basis of the line of sight detection information provided by said detecting apparatus.

48. A camera according to claim 38, wherein the detecting apparatus detects the line of sight of the observer in a finder to lead the light which has been transmitted through said lens device.

49. A camera according to claim 39, wherein the detecting apparatus detects the line of sight of the observer in a finder to lead the light which has been transmitted through said lens device.

50. A camera according to claim 40, wherein the detecting apparatus detects the line of sight of the observer in a finder to lead the light which has been transmitted through said lens device.

* * * * *

UNITED STATES PATENT AND TRADEMARK OFFICE
CERTIFICATE OF CORRECTION

PATENT NO. : 5,214,466
DATED : May 25, 1993
INVENTOR(S) : Akihiko Nagano, et al.

It is certified that error appears in the above-indentified patent and that said Letters Patent is hereby corrected as shown below:

In the drawings. Change "visual axis detection" to -- line of sight -- all occurrences Abstract [57], lines 5, 11 and 12. Change "visual axis" to -- line of sight --

Title, line 1. Change "visual axis" to -- line of sight --

Col. 1, line 15. Change "patent" to -- Patent --

Col. 1, line 19. Change "visual axis" to -- line of sight --

Col. 2, line 4. Change "an" to -- as --

Col. 3, line 44. Change "visual axis" to -- line of sight --

Col. 3, line 47. After "the" insert -- line of sight --

Col. 3, line 66. Change "visual axis" to -- line of sight --

Col. 4, line 3. Change "visual axis" to -- line of sight --

Col. 4, line 4. Change "faciliting" to -- facilitating --

Col. 7, line 2. After "lens" insert -- 4 --

Col. 7, line 5. Change "8" to -- ⊖ --

Col. 7, line 14. Change "visual axis" to -- line of sight --

Col. 7, line 67. Change "visual axis" to -- line of sight --

Col. 8, line 36. After "sight" insert -- can --

Col. 8, line 43. Change "photo" to -- photographing --

Col. 8, line 60. Change "arithmedic" to -- arithmetic --

Col. 9, line 39. Change "visual axis" to -- line of sight --

Col. 9, line 46. Change "idea" to -- ideas --

UNITED STATES PATENT AND TRADEMARK OFFICE
CERTIFICATE OF CORRECTION

PATENT NO. : 5,214,466
DATED : May 25, 1993
INVENTOR(S) : Akihiko Nagano, et al.

It is certified that error appears in the above-indentified patent and that said Letters Patent is hereby corrected as shown below:

Col. 10, line 29.   Change "visual axis" to -- line of sight --
Col. 10, line 61.   Change "s" to -- stopped --
Col. 11, line 57.   Delete "," (first occurrence)
Col. 12, line 15.   Change "visual axis" to -- line of sight --
Col. 12, line 21.   Change "be also" to -- also be --
Col. 14, line 56.   Change "visual axis" to -- line of sight --
Col. 16, line 10.   After "lens" insert -- in said lens --
Col. 16, line 44.   Change "1" to -- 2 --
Col. 17, line 31.   After "executing" insert -- a focus detection of a plurality of areas, and wherein said --
Col. 19, line 11.   Change "switehed" to -- switched --
Col. 20, line 8.    After "ing" insert -- operation --
Col. 20, line 25.   Change "fccusing" to -- focusing --

Signed and Sealed this

Eighth Day of March, 1994

Attest:

BRUCE LEHMAN

Attesting Officer    Commissioner of Patents and Trademarks